US012558986B2

(12) United States Patent
Hanson et al.

(10) Patent No.: US 12,558,986 B2
(45) Date of Patent: Feb. 24, 2026

(54) MACHINE CHARGING AND FILE HANDLING

(71) Applicant: Caterpillar Paving Products Inc.,
Brooklyn Park, MN (US)

(72) Inventors: Matthew Thomas Hanson, St Louis
Park, MN (US); John L. Marsolek,
Watertown, MN (US); **Nathaniel S
Doy**, Maple Grove, MN (US)

(73) Assignee: Caterpillar Paving Products Inc.,
Brooklyn Park, MN (US)

( * ) Notice: Subject to any disclaimer, the term of this
patent is extended or adjusted under 35
U.S.C. 154(b) by 831 days.

(21) Appl. No.: 17/888,829

(22) Filed: Aug. 16, 2022

(65) Prior Publication Data

US 2024/0059173 A1 Feb. 22, 2024

(51) Int. Cl.
B60L 53/66 (2019.01)
B60L 53/30 (2019.01)
B60L 53/65 (2019.01)

(52) U.S. Cl.
CPC ............. B60L 53/66 (2019.02); B60L 53/305
(2019.02); B60L 53/65 (2019.02)

(58) Field of Classification Search
CPC ......... B60L 53/65; B60L 53/66; B60L 53/305
See application file for complete search history.

(56) References Cited

U.S. PATENT DOCUMENTS

| | | | |
|---|---|---|---|
| 11,173,801 B2 | 11/2021 | Badger, II et al. | |
| 11,207,995 B2 | 12/2021 | Marsolek | |
| 2004/0100225 A1 | 5/2004 | Neil et al. | |
| 2018/0118047 A1* | 5/2018 | Uyeki | B60L 53/66 |
| 2020/0290476 A1 | 9/2020 | Brok | |
| 2021/0023956 A1* | 1/2021 | Tiwari | B60L 53/305 |
| 2021/0273466 A1 | 9/2021 | Robinson et al. | |

FOREIGN PATENT DOCUMENTS

| | | |
|---|---|---|
| DE | 102018110279 | 10/2019 |
| KR | 1020210056583 | 5/2021 |
| WO | WO2019154760 A1 | 8/2019 |

OTHER PUBLICATIONS

CAT MEC500, Mobile Equpment Charger, Caterpillar 2021, 2 pages.

* cited by examiner

*Primary Examiner* — Richard V Muralidar

(57) ABSTRACT

A method includes establishing a data connection between a first controller, and a second controller of a mobile machine. The method also includes causing, by the first controller, a charging unit to direct electrical current to an energy storage device of the mobile machine. The method further includes receiving, by the first controller a plurality of electronic files stored in a memory of the mobile machine, and storing the files in a memory of the charging unit. The method also includes providing to the second controller, by the first controller, an indication that each file of the plurality of electronic files has been stored in the memory of the charging unit. In such methods, second controller is configured to delete each file of the plurality of electronic files from the memory of the mobile machine based on the indication.

18 Claims, 3 Drawing Sheets

MACHINE CHARGING AND FILE HANDLING

TECHNICAL FIELD

The present disclosure relates to a system configured to control recharging various machines. More specifically, the present disclosure relates to a system configured to receive electronic files and/or other information from a machine while recharging the machine, and to provide such information to a remote controller for storage.

BACKGROUND

Haul trucks, paving machines, compaction machines, excavators, wheel loaders, and other mobile machines are often used to perform a variety of tasks at a worksite. For example, one or more haul trucks may be used to transport paving material from a paving material plant to a worksite so that the paving material can be distributed along a work surface of the worksite by one or more paving machines. One or more compaction machines may follow behind the paving machine, and may be operable to compact the freshly-laid paving material to a desired density or stiffness. In other examples, an excavator may be used to remove soil, minerals, or other materials from a work surface, and a haul truck may be used to transport such removed materials from a first location at the worksite to a different location. Such mobile machines may be powered by diesel fuel, battery power, solar power, fuel cells, or by other means, and in some examples, one or more of the machines described above may be autonomously or semi-autonomously controlled.

In the case of machines that powered at least in part by batteries, the use of such machines at a worksite requires recharging of the machines at various times during the work day. The recharging of these machines must be coordinated effectively in order to minimize work stoppages and to maximize efficiency at the worksite. Additionally, such machines typically include respective controllers, sensors, and other components configured to record and store operating information as tasks are performed at the worksite. Such information can be used to assist with managing the operation of worksite machines, predict failure of machine components, regulate machine maintenance schedules, and for other purposes. Typically, this information is stored in memory local to the machine until a network data connection is established or until an operator manually downloads such information.

An example system for coordinating the activities of paving machines is described in U.S. Pat. No. 11,173,801 (hereinafter referred to as the '801 reference). In particular, the '801 reference describes a system configured to charge a traction battery of a vehicle using a battery charger. The vehicle described in the '801 reference includes a transceiver that is configured to wirelessly transmit vehicle data to an external server, and to wirelessly receive battery charging settings from an external server. The vehicle also includes a controller configured to store various information in on-board vehicle memory.

The system described in the '801 reference is not, however, configured to manage the available storage capacity of the on-board memory. For instance, the system described in the '801 reference is not configured to facilitate the frequent deletion of information stored in the on-board memory. As a result, in some circumstances, information captured by various sensors and other components of the disclosed system may not be saved due to capacity limitations associated with the on-board memory. Additionally, the wireless transmission of vehicle data between the vehicle and the external server described in the '801 reference requires the use of a relatively high-speed and robust network connection. In some work environments, such as construction worksites, paving worksites, mining worksites, and the like, such network connections may note be available. In such work environments, the vehicle described in the '801 reference may not be able to reliably provide stored information to the external server, and in some situations, such information may be lost.

Example embodiments of the present disclosure are directed toward overcoming the deficiencies described above.

SUMMARY

In an example embodiment of the present disclosure, a method of controlling charging and data transfer between a mobile machine and a charging unit includes establishing, with a first controller associated with the charging unit, a data connection between the first controller and a second controller of the mobile machine. The method also includes causing, by the first controller, while the data connection exists, and via a power connection between the charging unit and the mobile machine, the charging unit to direct electrical current to an energy storage device of the mobile machine. The method further includes receiving, by the first controller and via the data connection, a plurality of electronic files stored in a memory of the mobile machine operably connected to the second controller, wherein the plurality of files is selected by the second controller for transfer to the first controller. Additionally, the method includes storing, by the first controller, the plurality of electronic files in a memory of the charging unit operably connected to the first controller. The method further includes providing to the second controller, by the first controller and via the data connection, an indication that each file of the plurality of electronic files has been stored in the memory of the charging unit. In such a method, the second controller is configured to delete each file of the plurality of electronic files from the memory of the mobile machine based on the indication.

In another example embodiment of the present disclosure, a charging unit includes a first controller, and a memory operably connected to the first controller. The memory stores instructions which, when executed by the first controller, cause the first controller to perform operations including establishing a data connection with a second controller of a mobile machine disposed at a worksite. The operations further include directing, while the data connection exists and via a power connection between the charging unit and the mobile machine, electrical current to an energy storage device of the mobile machine. Additionally, the operations include receiving, via the data connection, a plurality of electronic files stored in a memory of the mobile machine operably connected to the second controller, wherein the plurality of files is selected by the second controller for transfer to the first controller. The operations also include storing the plurality of electronic files in the memory operably connected to the first controller. The operations further include providing to the second controller, via the data connection, an indication that each file of the plurality of electronic files has been stored in the memory operably connected to the first controller. In such examples, the second controller is configured to delete each file of the plurality of electronic files from the memory of the mobile machine based on the indication. The operations also include severing the data connection based at least in part on: severing of the power connection, passage of a predetermined amount of time, or transfer of a predetermined amount of data from the second controller to the first controller.

In yet another example embodiment of the present disclosure, a system includes a stationary charging station disposed within a charging zone of a worksite, the charging station including a first controller and a memory operably connected to the first controller. The system also includes a mobile machine disposed at the worksite, the mobile machine including a second controller, a memory operably connected to the second controller, and a rechargeable battery. The system further includes a third controller disposed remote from the worksite. The system also includes a network configured to transfer information between at least the first controller and the third controller. In such examples, the first controller is configured to establish a data connection with the second controller, and to direct, while the data connection exists and via a power connection between the charging station and the mobile machine, electrical current to the rechargeable battery. The first controller is also configured to receive, via the data connection, a plurality of electronic files stored in the memory operably connected to the second controller, wherein the plurality of files is selected by the second controller for transfer to the first controller. The first controller is also configured to store the plurality of electronic files in the memory operably connected to the first controller. The first controller is further configured to provide to the second controller, via the data connection, an indication that each file of the plurality of electronic files has been stored in the memory operably connected to the first controller, wherein the second controller is configured to delete each file of the plurality of electronic files from the memory operably connected to the second controller based on the indication. The first controller is further configured to transfer, via the network, the plurality of electronic files from the memory operably connected to the first controller to the third controller.

DETAILED DESCRIPTION

Figure 1:
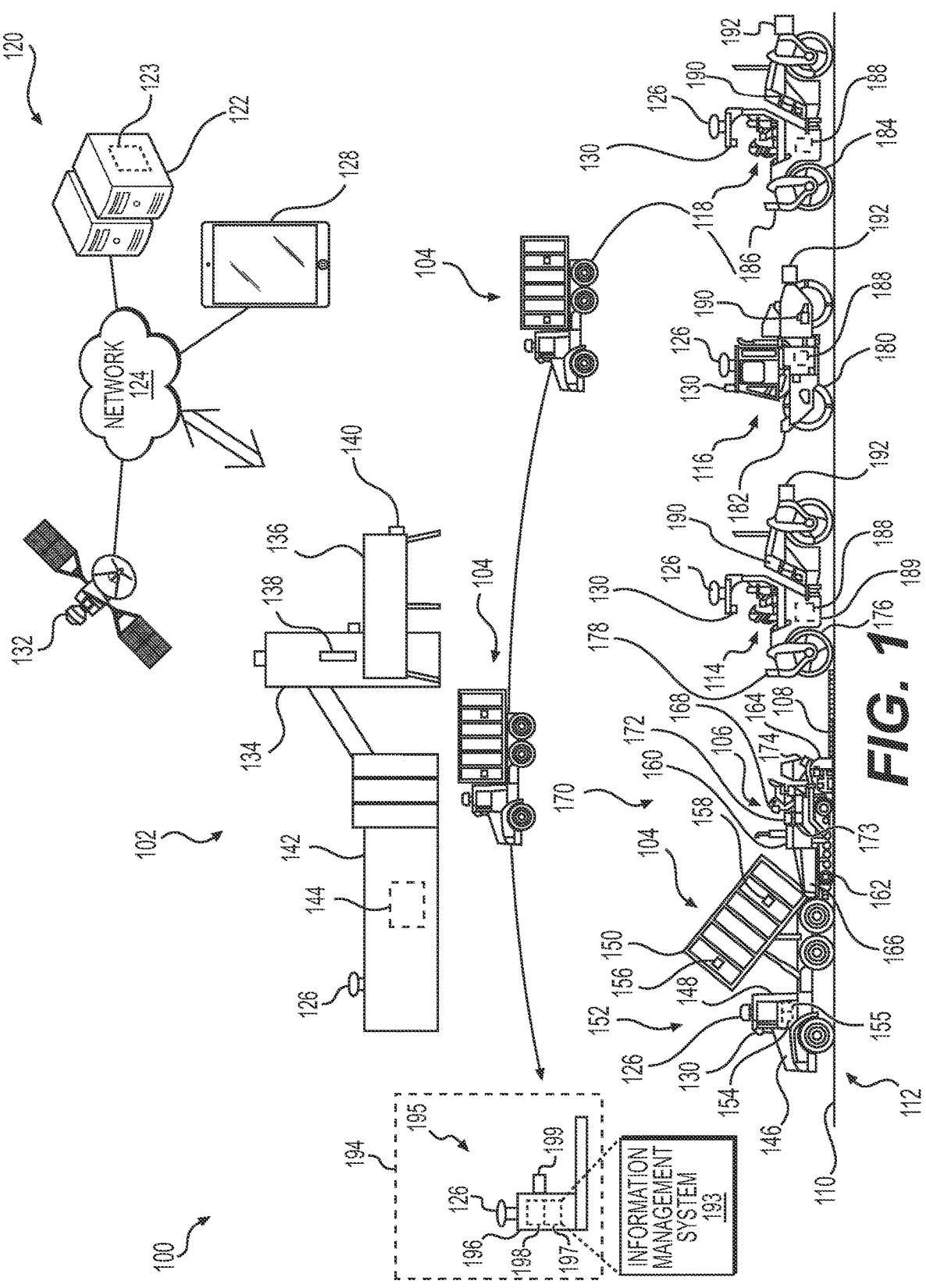
FIG. 1 is a schematic illustration of a system having a charging unit in accordance with an example embodiment of the present disclosure.

Wherever possible, the same reference numbers will be used throughout the drawings to refer to the same or like parts. Referring to FIG. 1, an example system may include one or more mobile machines configured to perform paving, construction, farming, mining, or other operations. Such a system 100 may comprise, for example, a paving system, a construction system, a farming system, a mining system, an excavation system, or any other system configured to utilize one or more mobile machines to perform an operation. For purposes of discussion, and without the intent of limiting the present disclosure to any particular type of system 100, an example paving system will be described in greater detail below. As shown in FIG. 1, an example system 100 may include one or more paving material plants 102, and a plurality of mobile machines such as one or more haul trucks 104 and/or one or more paving machines 106. For example, the paving material plant 102 may include various equipment configured to heat, produce, sense, store, and/or transfer paving material 108 such as asphalt. For instance, one or more haul trucks 104 may be loaded with a desired amount of paving material 108 at the paving material plant 102. The one or more haul trucks 104 may be configured to travel along various travel paths extending from the paving material plant 102 to, for example, a work surface 110 of a worksite 112, and/or to the worksite 112 generally. Such travel paths may include one or more partially or completely formed roads, highways, bridges, service roads, or other surfaces passable by construction and/or paving machines, and such an example worksite 112 may include, for example, a construction site, a roadwork site, a parking lot, or any other type of job site. Once a haul truck 104 has delivered the paving material 108 to the worksite 112, the haul truck 104 may transfer the paving material 108 to a hopper or other component of the paving machine 106, and the paving machine 106 may apply the paving material 108 to and/or otherwise deposit the paving material 108 on the work surface 110 in the form of a substantially flat, substantially smooth paving material mat. The system 100 may also include one or more other machines, such as one or more compaction machines 114, 116, 118, remixing transfer vehicles, wheel loaders, excavators, track-type tractors, motor graders, and/or other construction, mining, paving, or farming machines (not shown). In such examples, the one or more compaction machines 114, 116, 118 may be configured to compact the mat of paving material 108 to a desired density. It is understood that the consistency, density, and/or quality of the mat of paving material may be maximized when the paving machine 106 is controlled to operate at a substantially constant speed, and without stopping. Accordingly, in order to avoid paving machine stoppages, embodiments of the present disclosure may be used to monitor, manage, and/or otherwise control the recharging of the haul trucks 104, the paving machines 106, the compaction machines 114, 116, 118, and/or other components of the system 100 on a substantially continuous basis and in substantially real time. Controlling components of the system 100 in this way may minimize work stoppage, thereby improving the quality of the mat and the overall efficiency of the system 100. Additionally, the example systems 100 described herein may be configured such that information collected by the machines of the system 100 during performance of various operations may be stored locally in onboard memory of the respective machines. When the machines couple to a charging unit of the system 100 for recharging, controllers of the respective machines may provide such stored information to a controller of the charging unit for storage and eventual transfer to a remote system controller. As a result, the individual machines of the system 100 may be operable at the worksite 112 with relatively minimal wireless data communication capabilities, yet the wealth of information collected by the sensors and other components of such machines can be safely retained for future use.

The example system 100 shown in FIG. 1 may also include a control system 120 and one or more system controllers 122. In some examples, the control system 120 and/or the system controller 122 may be located at the paving material plant 102. In such examples, the control system 120 and/or the system controller 122 may also include components located remotely from the paving material plant 102 such as on any of the machines of the system 100, at the worksite 112, and/or at a remote command center (not shown). In other examples, the control system 120 and/or the system controller 122 may be located remote from the paving material plant 102 and/or remote from the worksite 112, such as at the remote command center referred to above. In any of the examples described herein, the functionality of system controller 122 may be distributed so that certain operations are performed at the paving material plant 102 and other operations are performed remotely. For example, some operations of the system controller 122 may be performed at the worksite 112, on one or more of the haul trucks 104, on one or more of the paving machines 106, etc. It is understood that the system controller 122 may comprise a component of the system 100, the paving material plant 102, one or more of the haul trucks 104, one or more of the paving machines 106, one or more of the compaction machines 114, 116, 118, a component of a separate mobile device (e.g., a mobile phone, a tablet, a laptop computer, etc.), and/or the control system 120.

The system controller 122 may be an electronic controller that operates in a logical fashion to perform operations, execute control algorithms, store and retrieve data and other desired operations. The system controller 122 may include or access memory 123, secondary storage devices, processors, and any other components for running an application. The memory 123 may be in the form of read-only memory (ROM) or random access memory (RAM) or integrated circuitry that is accessible by the system controller 122. Various other circuits may be associated with the system controller 122 such as power supply circuitry, signal conditioning circuitry, driver circuitry, and other types of circuitry.

The system controller 122 may be a single controller or may include more than one controller (such as additional controllers associated with each of the haul trucks 104, paving machines 106, compaction machines 114, 116, 118, and/or other machines of the system 100) configured to control various functions and/or features of the system 100. As used herein, the term "controller" is meant in its broadest sense to include one or more hardware or software control devices, processors, and/or microprocessors that may be associated with the system 100, and that may cooperate in controlling various functions and operations of the paving material plant 102 and the machines of the system 100. The functionality of the system controller 122 may be implemented in hardware and/or software without regard to the functionality. The system controller 122 may rely on one or more data maps relating to the operating conditions and the operating environment of the system 100 that may be stored in the memory 123 of the system controller 122. Each of these data maps may include a collection of data in the form of tables, graphs, and/or equations to maximize the performance and efficiency of the system 100 and its operation.

The components of the control system 120 may be in communication with and/or otherwise operably connected to any of the components of the system 100 via a network 124. The network 124 may be a local area network ("LAN"), a larger network such as a wide area network ("WAN"), or a collection of networks, such as the Internet. Protocols for network communication, such as TCP/IP, may be used to implement the network 124. Although embodiments are described herein as using a network 124 such as the Internet, other distribution techniques may be implemented that transmit information via memory cards, flash memory, or other portable memory devices.

It is also understood that the paving material plant 102, the various haul trucks 104, paving machines 106, compaction machines 114, 116, 118 and/or other components of the system 100 may include respective controllers, as well as respective memory or other such storage devices operably connected to the respective controllers. In some examples, the respective controllers of such components may be substantially similar to and/or the same as the system controller 122, and the respective memory of such components may be substantially similar to and/or the same as the memory 123. As will be described below, the respective memory of such components may be configured to store operating information associated with the tasks performed by the machines of the system 100. Once a data connection is formed between a controller of a respective machine and a controller of a charging unit, the controller of the machine may cause electronic files and/or other such stored operating information to be transferred to the charging unit controller for storage. The charging unit controller may then transfer such electronic files and/or other information received from the machine controller to the system controller 122. The system controller 122 may cause such electronic files and/or other information to be stored in the memory 123.

Each of the respective controllers described herein may be in communication and/or may otherwise be operably connected via the network 124. For example, the network 124 may comprise a component of a wireless communication system of the system 100, and as part of such a wireless communication system, the paving material plant 102, the one or more haul trucks 104, the paving machine 106, the one or more compaction machines 114, 116, 116, and/or other components of the system 100 may include respective communication devices 126. Such communication devices 126 may be configured to permit wireless transmission of a plurality of signals, instructions, electronic files, and/or information between the paving material plant 102, the haul trucks 104, the paving machines 106, the compaction machines 114, 116, 118, and the system controller 122, as well as to permit communication with other machines and systems remote from the paving material plant 102, haul trucks 104, paving machines 106, compaction machines 114, 116, 118, and/or the worksite 112. For example, such communication devices 126 may include a transmitter configured to transmit signals, electronic files, and/or other information to a receiver of one or more other such communication devices 126. In such examples, each communication device 126 may also include a receiver configured to receive such signals, electronic files, and/or other information. In some examples, the transmitter and the receiver of a particular communication device 126 may be combined as a transceiver or other such component. In any of the examples described herein, such communication devices 126 may also enable communication with one or more tablets, computers, cellular/wireless telephones, personal digital assistants, mobile devices, or other electronic devices 128 located at the worksite 112, at the paving material plant 102, and/or remote from the worksite 112 or the paving material plant 102. Such electronic devices 128 may comprise, for example, mobile phones and/or tablets of project managers (e.g., foremen) overseeing daily paving operations at the worksite 112 and/or at the paving material plant 102.

The network 124, communication devices 126, and/or other components of the wireless communication system described above may implement or utilize any desired system or protocol including any of a plurality of communications standards. The desired protocols will permit communication between the system controller 122, controllers of the respective machines, controllers of one or more charging units of the system 100, one or more of the communication devices 126, and/or any other desired machines or components of the system 100. Examples of wireless communications systems or protocols that may be used by the system 100 described herein include a wireless personal area network such as Bluetooth® (e.g., IEEE 802.15), a local area network such as IEEE 802.11b or 802.11g, a cellular network, or any other system or protocol for data transfer. Other wireless communication systems and configurations are contemplated. In some instances, wireless communications may be transmitted and received directly between the control system 120 and a machine (e.g., a paving machine 106, a haul truck 104, etc.) of the system 100 or between such machines. In other instances, the communications may be automatically routed without the need for re-transmission by remote personnel. Wired communication systems are also contemplated, as are systems using a combination of wireless and wired communication.

In example embodiments, one or more machines of the system 100 (e.g., the one or more haul trucks 104, the paving machine 106, the one or more compaction machines 114, 116, 118, and/or other such mobile machines.) may include a location sensor 130 configured to determine a location and/or orientation of the respective machine. In such embodiments, the communication device 126 of the respective machine may be configured to generate and/or transmit signals indicative of such determined locations and/or orientations to, for example, the system controller 122 and/or to the other respective machines of the system 100. In some examples, the location sensors 130 of the respective mobile machines may include and/or comprise a component of global navigation satellite system (GNSS) or a global positioning system (GPS). Alternatively, universal total stations (UTS) may be utilized to locate respective positions of the machines. In example embodiments, one or more of the location sensors 130 described herein may comprise a GPS receiver, transmitter, transceiver, laser prisms, and/or other such device, and the location sensor 130 may be in communication with one or more GPS satellites 132 and/or UTS to determine a respective location of the mobile machine to which the location sensor 130 is connected continuously, substantially continuously, or at various time intervals. One or more additional mobile machines of the system 100 may also be in communication with the one or more GPS satellites 132 and/or UTS, and such GPS satellites 132 and/or UTS may also be configured to determine respective locations of such additional machines. In any of the examples described herein, machine locations determined by the respective location sensors 130 may be used by the system controller 122 and/or other components of the system 100 to coordinate activities of the haul trucks 104, paving machine 106, compaction machines 114, 116, 118, and/or other components of the system 100. For example, machine locations determined by the respective location sensors 130 may be used by the system controller 122 and/or other components of the system 100 to determine travel paths, return paths, progress (e.g., a completion percentage) associated with a worksite plan, a return power required for one or more machines of the system 100 to traverse a return path, and/or other parameters described herein. Such parameters may be useful in minimizing and/or avoiding work stoppages caused by, for example, recharging of one or more machines of the system 100.

With continued reference to FIG. 1, the paving material plant 102 may include various material delivery components, mixers, heaters, and/or other equipment configured to assist in manufacturing paving material 108 for use in various paving operations. Such equipment may include, for example, one or more conveyors or other devices configured to transport paving material 108 to one or more paving material silos 134 or other holding locations for storage therein. The paving material plant 102 may also include one or more load stations 136 configured to transfer paving material 108 from the one or more paving material silos 134 to a haul truck 104. In such examples, a paving material silo 134 may include one or more sensors 138 configured to determine a temperature of paving material 108 stored within the paving material silo 134 and/or an amount of paving material 108 stored within the paving material silo 134 (e.g., a fill level of the paving material silo 134). Similarly, a load station 136 may include one or more sensors 140 configured to determine the presence and/or location of a haul truck 104, a time at which the haul truck 104 arrived at the load station 136, a time at which the haul truck 104 departed the load station 136, an amount (e.g., a weight) of paving material 108 loaded into the haul truck 104, and/or other operating parameters. In some examples, the sensor 140 may comprise a scale or other mass sensor configured to determine the weight of the haul truck 104 upon entering the load station 136, the weight of the haul truck 104 after paving material has been loaded into the haul truck 104, and/or a change in weight of the haul truck 104.

The paving material plant 102 may also include one or more scale houses, operator stations, or other stations 142 for use by paving material plant personnel. For example, as shown in phantom in FIG. 1, one or more such stations 142 may include a paving material plant controller 144 that is substantially similar to and/or the same as the system controller 122 described above. In some examples, the paving material plant controller 144 may comprise a component of the control system 120. In any of the examples described herein, the paving material plant controller 144 and/or other components of the paving material plant 102 may be configured to monitor, record, and/or communicate activities of the various haul trucks 104 entering and leaving the paving material plant 102.

As noted above, the haul trucks 104 of the system 100 may be operative to transport paving material 108 between the paving material plant 102 and one or more of the paving machines 106 located at the worksite 112. Each haul truck 104 may include a chassis 146 that supports a prime mover, such as an engine, and a cab 148 in which an operator may be positioned to provide input instructions to operate the haul truck 104. The engine is operatively connected to and drives a ground engaging drive mechanism such as wheels. A material transport unit such as a dump body 150 is pivotally mounted on the chassis 146 and receives a payload (e.g., paving material 108) to be hauled from one location to another.

Each haul truck 104 may include a truck control system 152 and a truck controller 154 generally similar or identical to the control system 120 and the system controller 122, respectively. The truck control system 152 and the truck controller 154 may be located on the haul truck 104 and may also include components located remotely from the haul truck 104 such as on any of the other machines of the system 100, at the paving material plant 102, or at a command center (not shown). For example, the truck controller 154 may include one or more processors, one or more hard drives, memory 155, or other storage devices operably connected to the truck controller 154, and/or other components. The functionality of truck controller 154 may be distributed so that certain functions are performed on the haul truck 104 and other functions are performed remotely. In some examples, the truck control system 152 and/or the truck controller 154 may enable autonomous and/or semi-autonomous control of the haul truck 104. As used herein, an "autonomous" machine of the system 100 may comprise a machine (e.g., a haul truck 104, a paving machine 106, a compaction machine 114, 116, 118, etc.) configured to traverse a travel path and/or perform various tasks or operations (e.g., lifting, dumping, paving, compacting paving material, etc.) without operator control or input. In such examples, the system controller 122 and/or a respective controller of the autonomous machine may substantially completely control such machine operations based on instructions, stored logic/programs, learning algorithms, or other components. As used herein, a "semi-autonomous" machine of the system 100 may comprise a machine configured to traverse a travel path and/or perform various tasks or operations upon receiving input and/or approval from an operator. In such examples, the system controller 122 and/or a respective controller of the semi-autonomous machine may substantially completely control such machine operations based on instructions, stored logic/programs, learning algorithms, or other components in combination with receipt of one or more inputs from an operator.

The haul truck 104 may also be equipped with a plurality of sensors connected to and/or otherwise in communication with the truck controller 154 and/or with the system controller 122. Such sensors may be configured to provide data indicative (directly or indirectly) of various operating parameters of the haul truck 104, systems associated with the haul truck 104, and/or the worksite 112 and/or other environment in which the haul truck 104 is operating. In any of the examples described herein, such sensors may comprise components of the truck control system 152, the control system 120, and/or the system 100, generally. For example, as noted above, the haul truck 104 may be equipped with a location sensor 130 configured to sense, detect, and/or otherwise determine a location and/or orientation of the haul truck 104. The location sensor 130 may include a plurality of individual sensors that cooperate to generate and provide location signals to the truck controller 154 and/or to the system controller 122 indicative of the location and/or orientation of the haul truck 104. In some examples, the location sensor 130 may be fixed to the cab 148, the chassis 146, and/or any other component of the haul truck 104. In other examples, however, the location sensor 130 may be removably attached to the haul truck 104 and/or disposed within, for example, the cab 148 of the haul truck 104 during operation of the haul truck 104. In some examples, the haul truck 104 may also include a load sensor 156 configured to sense, measure, and/or otherwise determine the load or amount of paving material 108 disposed within the dump body 150. The haul truck 104 may further include a temperature sensor 158 configured to sense, measure, and/or otherwise determine the temperature of the load (e.g., paving material 108) within the dump body 150. The haul truck 104 may further include one or more cameras (e.g., digital video cameras), proximity sensors, LIDAR sensors, RADAR sensors, SONAR sensors, infrared sensors, and/or other such components. The location, speed, acceleration, deceleration, temperature, load, video, proximity information, and other information determined by the components described above may be stored, by the truck controller 154, in the memory 155 of the haul truck 104. Such information and/or electronic files containing such information may be retained in the memory 155 until it is transferred to the system controller 122 via the network 124. Additionally or alternatively, such information and/or electronic files containing such information may be retained in the memory 155 until it is transferred to a controller of a charging unit disposed at the worksite 112. In such examples, a continuous, relatively high-bandwidth, relatively high file transfer rate, and/or relatively high-speed connection to the network 124 by the truck controller 154 (e.g., via the communication device 126 of the haul truck 104) may not be required.

The paving machine 106 may include a frame 160 having a set of ground engaging wheels or tracks 162 mounted thereto, as well as a screed 164 for spreading paving material 108 across a width of the work surface 110. The paving machine 106 may further include a hopper 166 for storing paving material 108 supplied by the haul truck 104 or another supply machine, and a conveyor system which transfers paving material 108 from the hopper 166 to the screed 164. The paving machine 106 may further include a display 168, such as an LCD display. The display 168 may be mounted to the frame 160 for viewing by an operator. In an example embodiment, the display 168 may be configured to display a map of the worksite 112 including icons or other visual indicia representing the work surface 110, the paving machine 106, the haul truck 104, one or more of the compaction machines 114, 116, 118, and/or other components of the system 100.

The paving machine 106 may also include a paving machine control system 170, a paving machine controller 172, and a memory 173 operably connected to the paving machine controller 172 generally similar or identical to the control system 120, the system controller 122, and the memory 123, respectively. The paving machine control system 170, the paving machine controller 172, and the memory 173 may be located on the paving machine 106, and may also include components located remotely from the paving machine 106 such as on any of the other machines of the system 100, at the paving material plant 102, or at a command center (not shown). For example, the paving machine controller 172 may include one or more processors, microprocessors, drivers, or other such hardware or software control components. The memory 173 operably connected to the paving machine controller 172 may comprise one or more hard drives, RAM, ROM, or other storage devices. The functionality of paving machine controller 172 may be distributed so that certain functions are performed on the paving machine 106 and other functions are performed remotely. In some examples, the paving machine control system 170, the paving machine controller 172, and/or the memory 173 may enable autonomous and/or semi-autonomous control of the paving machine 106.

The paving machine 106 may also be equipped with a plurality of sensors connected to and/or otherwise in communication with the paving machine controller 172 and/or with the system controller 122. Such sensors may be configured to provide data indicative (directly or indirectly) of various operating parameters of the paving machine 106, systems associated with the paving machine 106, and/or the worksite 112, and/or other environments in which the paving machine 106 is operating. In any of the examples described herein, such sensors may comprise components of the paving machine control system 170, the control system 120, and/or the system 100, generally. For example, in addition to the location sensor 130 and communication device 126 described above (here, shown disposed on the feeding haul truck 104, but as could also be caned by the paving machine 106 as well), the paving machine 106 may also include a temperature sensor 174 mounted, for example, on or proximate the screed 164. The temperature sensor 174 may be positioned and/or otherwise configured to determine the temperature of the mat of paving material 108 deposited on the work surface 110 by the screed 164. The paving machine 106 may further include one or more cameras (e.g., digital video cameras), proximity sensors, LIDAR sensors, RADAR sensors, SONAR sensors, infrared sensors, and/or other such components. Similar to the configuration described above with respect to the haul truck 104, the location, speed, acceleration, deceleration, temperature, screed height, video, proximity information, and other information determined by the sensors and/or other components of the paving machine 106 may be stored, by the paving machine controller 172, in the memory 173 of the paving machine 106. Such information and/or electronic files containing such information may be retained in the memory 173 until it is transferred to the system controller 122 via the network 124. Additionally or alternatively, such information and/or electronic files containing such information may be retained in the memory 173 until it is transferred to a controller of a charging unit disposed at the worksite 112. In such examples, continuous, relatively high-bandwidth, relatively high file transfer rate, and/or relatively high-speed connection to the network 124 by the paving machine controller 172 (e.g., via a communication device of the paving machine 106) may not be required.

As noted above, the system 100 may include one or more compaction machines 114, 116, 118 configured to compact the mat of paving material 108 deposited by the paving machine 106. In some examples, the compaction machine 114 may comprise a "breakdown" compactor having a breakdown drum 176, and the compaction machine 114 may be configured to follow relatively closely behind the paving machine 106, such that the breakdown drum 176 can compact paving material 108 distributed by the paving machine 106 while the paving material 108 is still relatively hot. Compacting with the compaction machine 114 when the paving material 108 is still relatively hot allows the breakdown drum 176 of the compaction machine 114 to perform a relatively large proportion of the total compaction desired for a particular lift of paving material 108, as relatively hotter asphalt in the paving material 108 can flow relatively readily and is thus readily compacted.

In addition to the communication device 126 and the location sensor 130 described above, the compaction machine 114 may further include any number of additional sensors configured to assist the compaction machine 114 in performing various paving (e.g., compaction) tasks. For example, such sensors may include one or more accelerometers or vibration sensors configured to sense the level of vibration (e.g., impacts per foot) imparted by the breakdown drum 176. The compaction machine 114 may also include a temperature sensor 178 mounted thereon and configured to sense, measure, and/or otherwise determine a temperature of the paving material 108 with which the compaction machine 114 is interacting or with which it has interacted. In some examples, the temperature sensor 178 may be substantially similar to and/or the same as the temperature sensor 174 of the paving machine 106. The compaction machine 114 may further include one or more cameras (e.g., digital video cameras), proximity sensors, LIDAR sensors, RADAR sensors, SONAR sensors, infrared sensors, and/or other such components.

The compaction machine 116 may be substantially similar to and/or the same as the compaction machine 114. In some examples, the compaction machine 116 may comprise an "intermediate" compactor, and may include an intermediate drum 180 which compacts paving material 108 already compacted at least once by the compaction machine 114. The compaction machine 116 may include a sensor or other device configured to sense a smoothness and/or stiffness of the paving material 108. Additionally, the compaction machine 116 may include the communication device 126 and the location sensor 130 described above, as well as any number of additional sensors configured to assist the compaction machine 116 in performing various paving (e.g., compaction) tasks. For example, such sensors may include one or more accelerometers or vibration sensors configured to sense the level of vibration (e.g., impacts per foot) imparted by the intermediate drum 180. The compaction machine 116 may also include a temperature sensor 182 mounted thereon and configured to sense, measure, and/or otherwise determine a temperature of the paving material 108 with which the compaction machine 116 is interacting or with which it has interacted. In some examples, the temperature sensor 182 may be substantially similar to and/or the same as the temperature sensor 174 of the paving machine 106. The compaction machine 116 may further include one or more cameras (e.g., digital video cameras), proximity sensors, LIDAR sensors, RADAR sensors, SONAR sensors, infrared sensors, and/or other such components.

The compaction machine 118 may also be substantially similar to and/or the same as the compaction machine 114. In some examples, the compaction machine 118 may comprise a "finishing" compactor, and may include a finish drum 184 configured to perform a final squeeze of the paving material 108. In such examples, the compaction machine 118 may be configured to follow relatively closely behind compaction machine 116. In some instances, it will be desirable to compact paving material 108 with the compaction machine 118 prior to its cooling below a temperature in the range of about 50 degrees Celsius to about 65 degrees Celsius. To this end, the compaction machine 118 may also include a temperature sensor 186 to verify whether the final compaction is taking place at an appropriate paving material temperature. As noted above with respect to the compaction machines 114, 116, the compaction machine 118 may also include a communication device 126 and a location sensor 130, as well as any number of additional sensors configured to assist the compaction machine 118 in performing various paving (e.g., compaction) tasks. For example, such sensors may include one or more accelerometers or vibration sensors. The compaction machine 118 may further include one or more cameras (e.g., digital video cameras), proximity sensors, compaction/density sensors, LIDAR sensors, RADAR sensors, SONAR sensors, infrared sensors, and/or other such components.

As noted above, one or more machines of the system 100 may include respective controllers configured to control various operations of the machine. Such controllers may be utilized, for example, to assist in controlling the autonomous and/or semi-autonomous machines of the system 100 described herein. For example, one or more of the compaction machines 114, 116, 118 may include a respective controller 188, and a memory 189 operably connected to the respective controller 188. In such examples, the controller 188 may be substantially similar to and/or the same as the truck controller 154 and/or the paving machine controller 172 described above. For example, the controller 188 may comprise a compaction machine controller, and the controller 188 may be located on the one or more compaction machines 114, 116, 118. The controller 188 may also include components located remotely from the one or more of the compaction machines 114, 116, 118, such as on any of the other machines of the system 100, at the paving material plant 102, or at a command center (not shown). For example, the controller 188 may include one or more processors, microprocessors, drivers, or other such hardware or software control components. The memory 189 operably connected to the controller 188 may comprise one or more hard drives, RAM, ROM, or other storage devices local to (e.g., carried onboard) the one or more respective compaction machines 114, 116, 118. The functionality of the controller 188 may be distributed so that certain functions are performed on the one or more of the compaction machines 114, 116, 118, and other functions are performed remotely. In some examples, the controller 188 may enable autonomous and/or semi-autonomous control of the respective compaction machine 114, 116, 118 to which it is operably connected.

Similar to the configuration described above with respect to the haul truck 104, the location, speed, acceleration, deceleration, temperature, compaction/density of the paving material 108, video, proximity information, and other information determined by the sensors and/or other components of the respective compaction machines 114, 116, 118 may be stored, by the respective controller 188, in the respective memory 189 of the particular compaction machine 114, 116, 118. Such information and/or electronic files containing such information may be retained in the memory 189 until it is transferred to the system controller 122 via the network 124. Additionally or alternatively, such information and/or electronic files containing such information may be retained in the memory 189 until it is transferred to a controller of a charging unit 195 disposed at the worksite 112. In such examples, a continuous, relatively high-bandwidth, relatively high file transfer rate, and/or relatively high-speed connection to the network 124 by the controllers 188 of the respective compaction machines 114, 116, 118 (e.g., via respective communication devices of the compaction machines 114, 116, 118) may not be required.

Further, each mobile machine of the system 100 may be powered, at least in part, by one or more diesel engines, gasoline engines, compressed natural gas engines, electric motors, fuel cells, or other prime movers. In examples in which the prime mover of the respective machine comprises one or more electric motors or other component powered at least in party by stored electric energy, such machines may require periodic recharging for continued operation. Accordingly, each mobile machine of the system 100 described herein may include one or more energy storage devices 190 configured to store energy consumable by the prime mover of the respective machine to generate power. In examples in which the prime mover comprises an electric motor other component powered at least in party by stored electric energy, the energy storage device 190 may comprise one or more rechargeable batteries configured to store electronic charge and to controllably provide electrical current to the electric motor. For ease of description, and unless otherwise specified, the energy storage devices 190 discussed herein will be described as rechargeable batteries. In such examples, the respective prime movers (e.g., the prime movers of the compaction machines 114, 116, 118) may comprise electric motors. In any such examples, and as generally noted above, one or more of the compaction machines 114, 116, 118 may comprise manually operated machines, autonomous machines, or semi-autonomous machines.

One or more mobile machines of the system 100 may also include a coupling device 192 operably connected to the energy storage device 190 of the respective machine. In such examples, the coupling device 192 may be configured to receive energy or other materials consumable by the prime mover of the respective machine to generate power. For instance, in examples in which the prime mover comprises an electric motor, the coupling device 192 may comprise one or more magnetic and/or conductive lugs, terminals, receptacles, leads, contacts, or other components configured to receive electrical current, via a power connection established between the coupling device 192 and a corresponding coupling device, at a desired voltage or over a range of voltages. In such examples, the coupling device 192 may be configured to direct the received current to the rechargeable batteries or other energy storage device 190 of the machine.

In any of the examples described herein, the coupling device 192 may also be configured to receive electronic signals from and/or to transfer electronic signals to a corresponding coupling device with which the coupling device 192 is connected. For example, the coupling device 192 may be configured to form a data connection with a corresponding coupling device when connected thereto. Such a data connection may be separate from the power connection described above, but may be formed when the corresponding coupling devices are mated. For example, in addition to the one or more magnetic and/or conductive lugs, terminals, receptacles, leads, contacts, or other components described above and configured to receive electrical current, the coupling device 192 may include one or more additional contacts, couplings, electrical leads, or other components configured to receive a plurality of electronic files, signals, or other digital items containing information that can be processed by the controller 188 and/or saved in the memory 189. Such additional contacts, couplings, electrical leads, or other components may also be configured to provide a plurality of electronic files, signals, or other digital items containing information stored in the memory 189. Such electronic files and/or other information may be received and/or transmitted via the coupling device 192 while the data connection described above exists. Similarly, the electrical current described above may be received vis the coupling device 192 and directed to the energy storage device 190 of the machine while such a data connection exists. If necessary, coupling device 192 (and other structures of the machines) may include suitable protective measures such as isolation circuitry to ensure that the current used for charging the machine associated therewith does not undesirably affect the data connection and files, signals or other digital items being transmitted through the coupling device 192.

As shown in FIG. 1, the system 100 may also include one or more charging zones 194 and one or more charging units 195. As will be described with respect to FIG. 2, in some examples, such charging units may comprise one or more additional mobile machines such as mobile charge trucks, rovers, or other devices configured to traverse portions of the work surface 110, and to recharge energy storage devices 190 of mobile machines (e.g., a haul truck 104, a paving machine 106, one or more compaction machines 114, 116, 118, etc.) disposed at different locations of the worksite 112. Such a mobile charging unit may be disposed within a designated (e.g., stationary) charging zone 194 or, alternatively, may travel to locations outside of such a designated charging zone 194 in order to, for example, direct a supply of electrical current or energy to an energy storage device 190 of another mobile machine. As will be described with respect to FIG. 2, in such examples, a mobile charging unit may carry and/or otherwise include a supply of such energy.

As illustrated in FIG. 1, another example charging unit 195 may comprise a stationary charging station 196 disposed within the charging zone 194. In some examples, each charging zone 194 may include one or more charging stations 196. In such examples, a charging zone 194 may comprise an area, portion, or section of the worksite 112, and such charging zones 194 may have one or more fences, gates, or other boundaries defining at least part of a perimeter (whether physical or virtual) of the charging zone 194. One or more of the charging stations 196 may be disposed at least partly within each charging zone 194. Such charging stations 196 may be configured to direct a supply of electrical current or energy to a mobile machine of the system 100. The charging stations 196 may include a supply of such energy.

Each charging unit 195 may also include at least one of an information management system 193, a controller 197, a memory 198 operably connected to the controller 197, a coupling device 199, or a communication device 126. In such examples, the controller 197 may be substantially similar to and/or the same as the system controller 122, and the communication device 126 of the charging unit 195 may be substantially similar to and/or the same as the one or more communication devices 126 described above. The controller 197 of the charging unit 195 may, thus, be configured to receive information (e.g., electronic files) from the system controller 122 (via the communication device 126), and/or to transfer information (e.g., electronic files) to the system controller 122 (via the communication device 126). It is understood that receipt of information from the system controller 122 via the communication device 126 and/or transfer of information to the system controller 122 via the communication device 126 may be performed wirelessly, by the controller 197, via the network 124.

The information management system 193 illustrated schematically in FIG. 1 may comprise a hardware component of the controller 197, a software component of the charging unit 195 stored in the memory 198, and/or a combination thereof. In any of the examples described herein the information management system 193 may be configured to perform one or more of the operations described herein. For example, the information management system 193 may comprise a processor, a microprocessor, a programmable logic controller, or other device configured to establish a data connection between the controller 197 and a controller (e.g., the controller 188) of a mobile machine disposed at the worksite 112, and/or with the system controller 122 (e.g., via the network 124). The information management system 193 may also be configured to receive, via such a data connection, a plurality of electronic files stored in a memory (e.g., the memory 189) of the mobile machine, and to store the received electronic files in the memory 198 of the charging unit 195. Further, the information management system 193 may be configured to generate an indication that each of the electronic files has been stored in the memory 198, and to provide such an indication to the controller (e.g., the controller 188) of the mobile machine via the data connection. Further, the controller 197 and/or the information management system 193 of the charging unit 195 may provide and/or otherwise transfer, via the data connection, one or more additional electronic files to the controller of the machine. In some examples, such one or more additional electronic files may be executable by the controller of the machine to update a software application, program, component, or other such software system of the machine. In such examples, such one or more additional electronic files may be received, by the controller 197 of the charging unit 195, from the system controller 122, via the network 124. In any of the examples described herein, the controller 197 and/or the information management system 193 may be configured to perform one or more of the above operations, and to perform additional operations associated with the receipt, storage, and/or transmission of information. Further, it is understood that in any of the examples described herein, the system controller 122 may provide one or more such additional electronic files or other information directly to the controller of the machine (e.g., to the controller 188 of the compaction machine 114) via the network 124 (e.g., using the communication device 126). In such examples, the controller of the machine may also provide one or more electronic files or other information directly to the system controller 122 via the network (e.g., using the communication device 126).

In some examples, the controller 197 and/or the information management system 193 may be configured to receive information (e.g., electronic files) from the controllers of the respective machines wirelessly via the associated communication devices 126 (and/or via the network 124). In such examples, the controller 197 and/or the information management system 193 may also be configured to transfer information (e.g., electronic files) to the controllers of the respective machines wirelessly via the communication devices 126 (and/or via the network 124). Additionally or alternatively, the example charging units 195 of the present disclosure may be configured to receive information (e.g., electronic files) from and/or to transfer information (e.g., electronic files) to a machine present at the charging unit 195 when the coupling device 199 is mated with a corresponding coupling device 192 of the machine. In such examples, the controller 197 and/or the information management system 193 of the charging unit 195 may establish a data connection between the controller 197 and the controller of the machine by causing the coupling device 199 to mate with the corresponding coupling device 192 of the machine. As described herein, causing the coupling device 199 to mate with the corresponding coupling device 192 of the machine may also establish a power connection between the charging unit 195 and the machine.

An example coupling device 199 may comprise one or more magnetic and/or conductive lugs, terminals, receptacles, leads, contacts, or other components configured to provide electrical current at a desired voltage or over a range of voltages. In addition to the one or more magnetic and/or conductive lugs, terminals, receptacles, leads, contacts, or other components described above and configured to provide electrical current, the coupling device 199 may include one or more additional contacts, couplings, electrical leads, or other components configured to receive, via the data connection described above, a plurality of electronic files, signals, or other digital items containing information that can be processed by the controller 197 and/or saved in the memory 198. Such additional contacts, couplings, electrical leads, or other components may also be configured to provide, via the data connection, a plurality of electronic files, signals, or other digital items containing information stored in the memory 198. If necessary, the coupling device 199 (and other structures of the charging unit 195) may include suitable protective measures such as isolation circuitry to ensure that the electrical current used for charging does not undesirably affect the data connection and files, signals or other digital items being transmitted through the coupling device 199.

The controller 197 of the charging unit 195 may be configured to cause the charging unit 195 to provide a flow of electrical current to a machine of the system 100 upon execution of various instructions. In some embodiments, the example charging units 195 described herein may also include one or more motors or other actuators operably connected to the controller 197. For example, such actuators may be connected to a moveable arm, shaft, rod, or other moveable structure, and the coupling device 199 may be connected to the moveable structure such that the coupling device 199 is moveable relative to a frame, housing, or other stationary component of the charging unit 195. In such embodiments, the actuator may move, orient, and/or otherwise position the coupling device 199 so as to mate the coupling device 199 with a corresponding coupling device 192 of a machine present at the charging unit 195. Additionally, in some embodiments the charging unit 195 may include one or more sensors or other devices in communication with the controller 197 and configured to detect a faulty connection between the coupling device 199 of the charging unit 195 and a corresponding coupling device 192 of the machine present at the charging unit 195. For example, such a sensor may comprise a ground fault sensor or other sensor configured to detect a grounding issue, an open circuit, or other faulty electrical connection when the coupling device 199 of the charging unit 195 is coupled to the coupling device 192. In any of the examples herein, such sensors may be configured to send a signal to the controller 197 upon detecting such a faulty connection. The controller 197 may be configured to, for example, cause the charging unit 195 to stop the flow of electrical current in response to such a signal. The controller 197 may also be configured to provide an alert or other message to the controller 122, one or more electronic devices 128, and/or one or more machines of the system 100 in response to such a signal.

Figure 2:
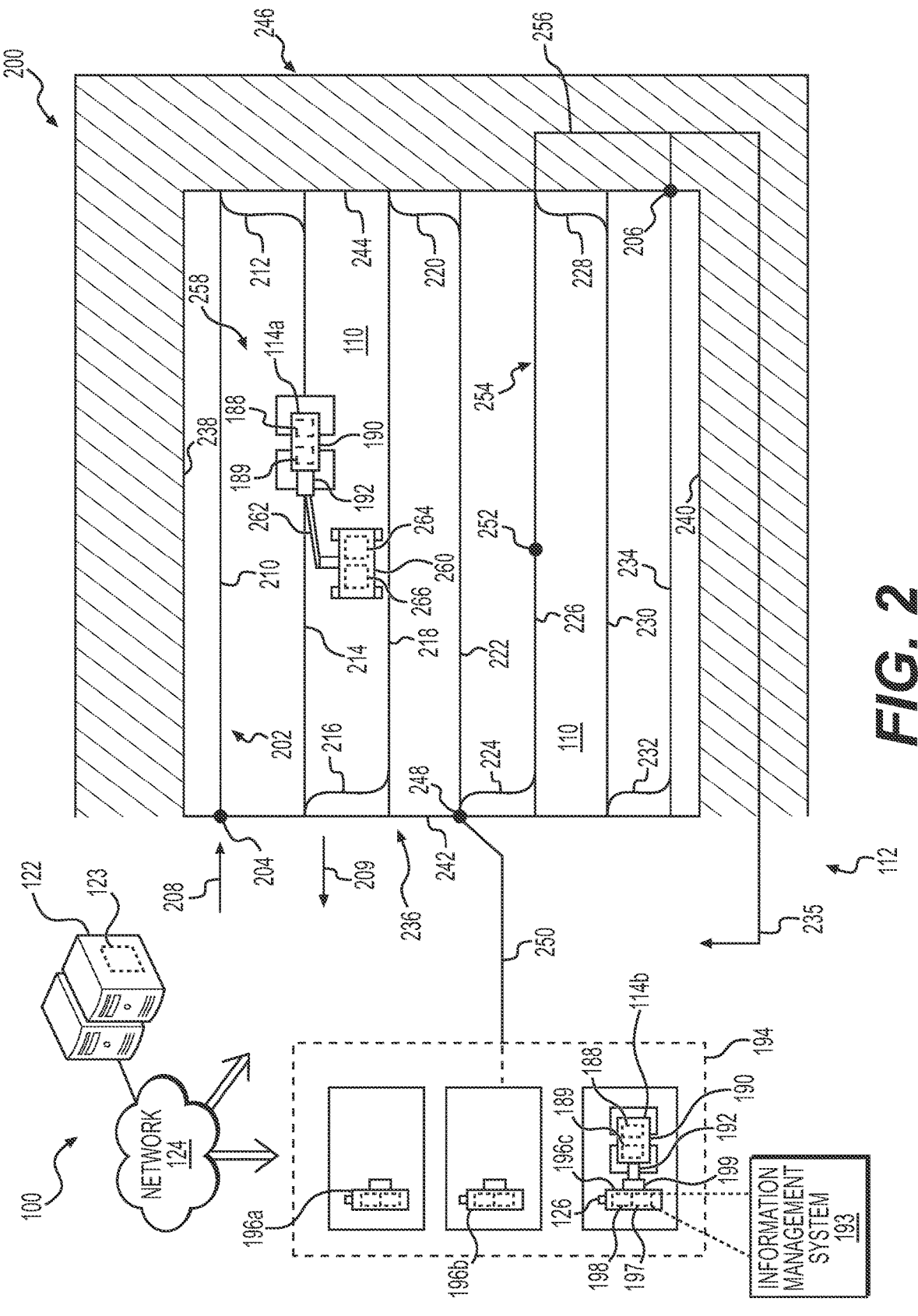
FIG. 2 is a schematic illustration of a worksite at which one or more mobile machines of the system shown in FIG. 1 may be utilized.

FIG. 2 is an example schematic diagram illustrating various components of the system 100 in further detail. For example, FIG. 2 provides a visual illustration of an example environment 200. The visual illustration of the environment 200 includes lines, arrows, and other visual indicia that correspond to and/or indicate an example travel path 202 of a particular machine (e.g., a compaction machine 114a, 114b, 114c, etc.) of the system 100, a start location 204 of the travel path 202, an end location 206 of the travel path 202, one or more arrows 208, 209 indicating respective directions of travel along the travel path 202, as well as other information. As an example mobile machine (e.g., the compaction machine 114a shown in FIG. 2) of the system 100 traverses the travel path 202, the sensors and other components of the machine described above collect, sense, and/or otherwise determine information related to performance of the machine and/or related to conditions (e.g., temperature, density, etc.) of the environment 200, and store such information (e.g., as or in respective electronic files) in a memory (e.g., the memory 189) of the machine. As will be described below, during a recharging event, the controller (e.g., controller 188) of the respective machine transfers at least part of the above information to a controller (e.g., the controller 197 of the charging station 196 or a controller of a mobile charging unit) for storage in a memory operably connected thereto.

As shown in FIG. 2 an example travel path 202 may include one or more segments defined by the work surface 110. In some examples, the travel path 202 may include a plurality of sequential segments extending along the work surface 110. In particular, the example travel path 202 shown in FIG. 2 includes a first segment 210, a first turn 212, a second segment 214, a second turn 216, a third segment 218, a third turn 220, a fourth segment 222, a fourth turn 224, a fifth segment 226, a fifth turn 228, a sixth segment 230, a sixth turn 232, and a seventh segment 234. In some examples, and depending upon the shape, size, and/or other configuration of the work surface 110, one or more of the segments included in the travel path 202 may be substantially parallel to one another. Also, it is understood that any of the example travel paths 202 described herein may include greater than or less than the number of segments, turns, and/or other components of the travel path 202 illustrated in FIG. 2. Additionally, the compaction machine 114a may travel in forward and/or reverse directions along any of the segments (e.g., segments 210, 214, 218, 222, 226, 230, 234) and/or turns included in the travel path 202. Further, any of the turns (e.g., turns 212, 216, 220, 224, 228, 232) included in the travel path 202 may be "K" turns, "S" turns, and/or any other type of turning maneuver. As shown in FIG. 2, for example, the compaction machine 114a may travel from left to right (i.e., in the direction of arrow 208) along segment 210, and may reverse direction to travel along the turn 212. The compaction machine 114a may then travel in the direction of arrow 208 to a perimeter 236 of the work surface 110. For instance, the perimeter 236 may comprise a plurality of boundaries 238, 240, 242, 244, and the compaction machine 114a may travel along the segment 214 in the direction of arrow 208 to the boundary 244. Upon reaching the boundary 244, the compaction machine 114a may travel, in the direction of arrow 209, along the segment 214 until reaching the boundary 242 and/or making the turn 216. A similar process may be repeated for any of the turns (e.g., turns 216, 220, 224, 228, 232) included in the travel path 202. Moreover, in any of the examples described herein, the compaction machine 114a may be controlled to remain within the perimeter 236. For example, the travel path 202 may prohibit the compaction machine 114a from crossing and/or exiting the perimeter 236. Alternatively, the worksite 112 may include a maneuver zone 246 substantially surrounding at least part (or in some examples, all) of the perimeter 236. The maneuver zone 246 may comprise an area of the worksite 112 configured for machine travel, and in such embodiments, the compaction machine 114a may make one or more turns (e.g., turns 212, 216, 220, 224, 228, 232) or other maneuvers within the maneuver zone 246. In such examples, the maneuver zone 246 may define at least part of the travel path 202. Such travel paths may be configured in order to satisfy compaction requirements or specifications associated with the paving material 108 being deposited on the work surface 110. Such compaction requirements may specify that the compaction machine 114a is required to travel along the travel path 202 (e.g., from the start location 204 to the end location 206) a predetermined number of times, (e.g., 2 times, 3 times, 4 times, etc.). Additionally or alternatively, such compaction requirements may require that the paving material 108 be compacted to a minimum density or stiffness.

With continued reference to FIG. 2, and as noted above, one or more of the charging stations described herein (e.g., charging stations 196a, 196b, 196c, etc.) may be configured to recharge various machines (e.g., compaction machines 114a, 114b, 114c, etc.) of the system 100, as needed, to maintain substantially continuous coordinated operation of such machines at the worksite 112 and to maximize efficiency. Such charging stations 196a, 196b, 196c may also be configured to receive electronic files and/or other information from the various machines while the machines are charging.

In any of the examples described herein, the system controller 122 and/or the controller of the respective machine (e.g., the controller 188 of the compaction machine 114a) may be configured to determine one or more return paths extending from a current location of the machine to the charging zone 194. With respect to the compaction machine 114a shown in FIG. 2, in some examples the system controller 122 and/or the controller 188 may determine whether the battery or other storage device 190 of the compaction machine 114a has a sufficient amount of available power stored therein to traverse a particular travel path 202 and to return to the charging zone 194 after reaching the end location 206. In such examples, if the system controller 122 determines that the storage device 190 of the compaction machine 114a does have a sufficient amount of available power stored therein to traverse the entire travel path 202, the system controller 122 may cause the compaction machine 114a to traverse the travel path 202 without the need for periodic recharging. On the other hand, if the system controller 122 determines that the storage device 190 of the compaction machine 114a does not have a sufficient amount of available power stored therein to traverse the entire travel path 202, the system controller 122 may, in some examples, cause the compaction machine 114a to traverse a shorter travel path 202, or to return to the charging zone 194 in order to fully charge the energy storage device 190. If such a determination is made while the compaction machine 114a is disposed at the end of a particular segment (e.g., at an example location 248 at the end of the segment 222), the system controller 122 and/or the controller 189 may cause the compaction machine 114a to traverse a return path 250 extending substantially directly from the location 248 to the charging zone 194. Alternatively, if such a determination is made while the compaction machine 114a is disposed along a particular segment (e.g., at a location 252 along the segment 226), the system controller 122 and/or the controller 189 may cause the compaction machine 114a to traverse a return path 254 extending at least partly along the current segment (e.g., the segment 226) and including an additional segment 256 extending substantially directly from an end of the current segment to the charging zone 194. Any of the example scenarios noted above may assist in maintaining substantially continuous operation of the compaction machine 114a once it begins traversing the travel path 202.

In any of the embodiments described herein, if the compaction machine 114a does not have sufficient charge to return to the charging zone 194 from a current location 258 at which it is disposed, and/or if in the interest of productivity, it is preferably to recharge the compaction machine 114a at its current location 258 on the work surface 110, the system controller 122 may cause one or more additional mobile machines 260 to travel to such an example location 258 in order to recharge the compaction machine 114a. In such examples, the additional mobile machine 260 may comprise a charging truck, a rover, or other such vehicle carrying a supply of fuel electrical energy (e.g., charged batteries), and configured to direct such energy to the energy storage device 190 of the compaction machine 114a via the coupling 192. For instance, the mobile machine 260 may comprise a manual, semi-autonomous, or fully-autonomous machine of the system 100. The mobile machine 260 may include a coupling device 262 that is substantially similar to the coupling device 199 described above with respect to the charging station 196. The mobile machine 260 may also include a controller 264 and a memory 266 that are substantially similar to the controller 197 and the memory 198 of the charging station 196, respectively.

For example, the coupling device 262 of the mobile machine 260 may be configured to mate with the corresponding coupling device 192 of the compaction machine 114a in order to establish both a power connection and a data connection between the mobile machine 260 and the compaction machine 114a. An example coupling device 262 may comprise one or more magnetic and/or conductive lugs, terminals, receptacles, leads, contacts, or other components configured to provide electrical current at a desired voltage or over a range of voltages. In addition to the one or more magnetic and/or conductive lugs, terminals, receptacles, leads, contacts, or other components described above and configured to provide electrical current, the coupling device 262 of the machine 260 may include one or more additional contacts, couplings, electrical leads, or other components configured to establish the data connection described above, and to thereby receive a plurality of electronic files, signals, or other digital items containing information that can be processed by the controller 264 and/or saved in the memory 266. Such additional contacts, couplings, electrical leads, or other components may also be configured to provide, via the data connection and to the controller 188 of the compaction machine 114a, a plurality of electronic files, signals, or other digital items containing information stored in the memory 266 of the mobile machine 260. If necessary, coupling device 262 (and other structures of the mobile machine 260) may include suitable protective measures such as isolation circuitry to ensure that the electrical current used for charging does not undesirably affect the data connection and files, signals or other digital items being transmitted through the coupling device 262. The coupling device 262 may also comprise one or more linkages, arms, hydraulic cylinders, pneumatic actuators, solenoids, electric motors, or other components that are moveable relative to a frame of the machine 260 and configured to move, manipulate, and/or otherwise orient the magnetic and/or conductive lugs, terminals, receptacles, leads, contacts, or other components of the coupling device 262 relative to the coupling device 192. In such examples, the mobile machine 260 and/or the coupling device 262 may also include one or more cameras, proximity sensors, load sensors, flow sensors, conductivity sensors, or other components operably connected to the controller 264, and configured to assist the controller 264 with guiding movement of the coupling device 262 relative to the coupling device 192 of the compaction machine 114a, and/or with mating the coupling device 262 with the coupling device 192. In examples in which the machine 260 comprises a semi-autonomous or a fully-autonomous machine, the system controller 122 may provide instructions executable by the controller 264, or may communicate with the controller 264 to remotely control operations of the machine 260, via the controller 264.

In this way, the system controller 122, in cooperation with the mobile machine 260, may cause compaction activities at the worksite 112 to continue substantially uninterrupted even when a compaction machine 114a is in need of recharging. Additionally, the controller 264 of the mobile machine 260 may establish a data connection with the controller 188 of the compaction machine 114a. While the data connection exists, the mobile machine 260 may direct, via a power connection, electrical current to the energy storage device 190 of the compaction machine 114a. The controller 264 of the mobile machine 260 may also receive, via the data connection, a plurality of electronic files or other information stored in the memory 189 of the compaction machine 114a. The controller 264 of the mobile machine 260 may store such files or other information in the memory 266 operably connected to the controller 264 and may provide, via the data connection and to the controller 188, an indication that each of the files and/or other information has been stored in the memory 266. In some examples, the machine 260 may traverse a path along the work surface 110 to the charging zone 194, the controller 264 may establish a second data connection with a controller 197 of a charging station 196 (e.g., by mating the coupling device 262 with the coupling device 199 of the charging station 196), and the controller 264 may transfer the files or other information received from the controller 188, from the memory 266 and via the second data connection, to the controller 197. In such examples, the controller 197 may cause such files or other information to be stored in the memory 198 until a data connection is established, via the network 124, between the system controller 122 and the controller 197 of the charging device 196. Additionally or alternatively, the controller 264 may establish a second data connection with the system controller 122, via the network 124 and without mating the coupling device 262 with the coupling device 199 of the charging station 196. In such examples, the controller 264 may transfer the files or other information received from the controller 188, from the memory 266 and via the second data connection (e.g., directly to the system controller 122 via the network 124). Such control strategies may minimize work stoppages and may optimize the efficiency of the system 100. Such control strategies may also ensure that operating information collected by the various machines of the system 100 is securely maintained, such as through transfer to other controllers/memory during recharging events.

Figure 3:
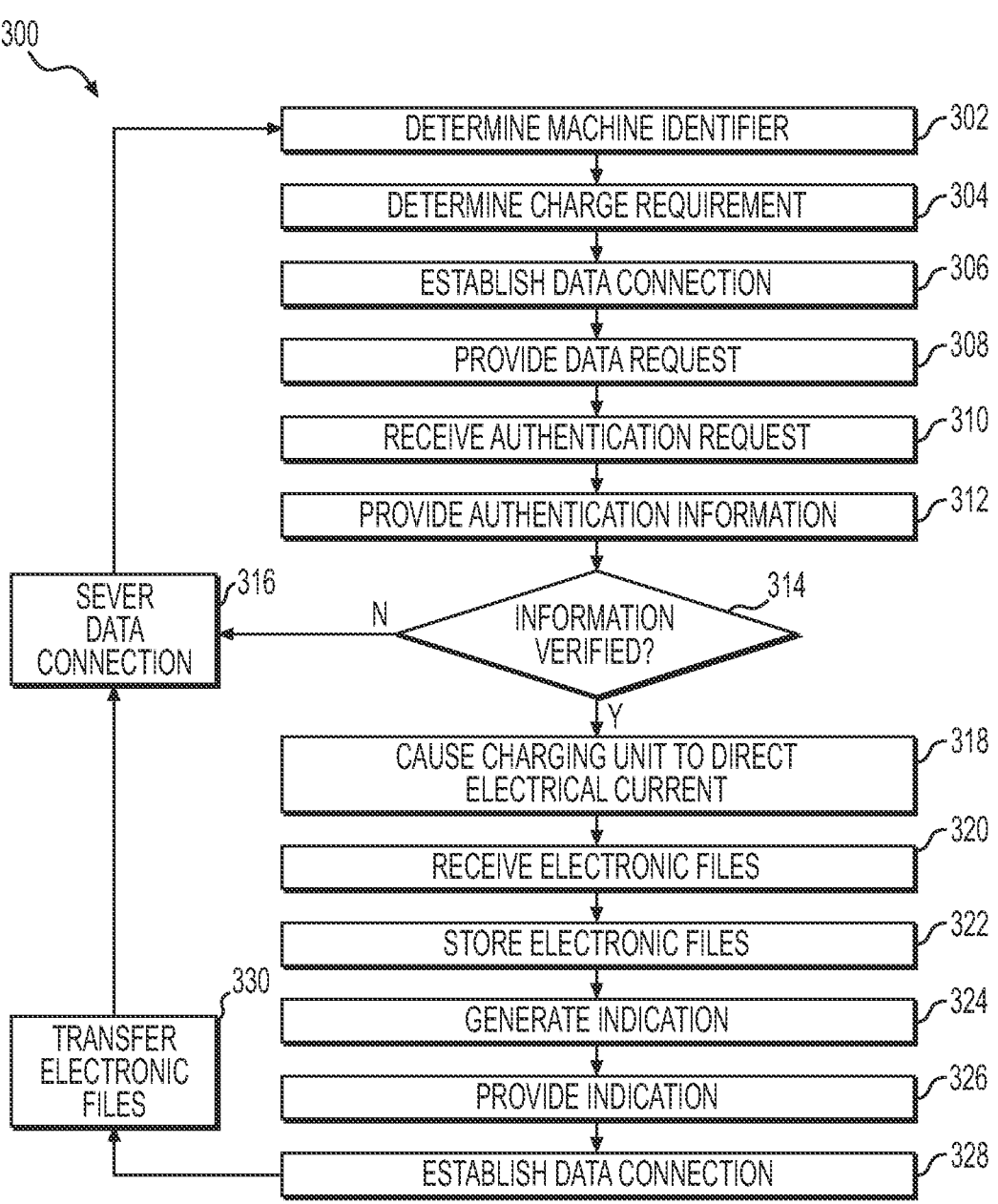
FIG. 3 is a flow chart depicting an example method associated with the system shown in FIG. 1.

FIG. 3 illustrates a flow chart depicting an example method 300 associated with the system 100. In particular, the flow chart of FIG. 3 illustrates an example method 300 of coordinating the activities of multiple machines associated with the system 100 described above in order to recharge such machines while minimizing and/or substantially eliminating work stoppages. The example method 300 is also configured to facilitate the transfer of electronic files or other information from memory onboard such machines to memory operably connected to a charging device and/or to memory 123 operably connected to a system controller 122 during recharging events. The example method 300 is illustrated as a collection of steps in a logical flow diagram, which represents operations that can be implemented in hardware, software, or a combination thereof. In the context of software, the steps represent computer-executable instructions stored in memory. When such instructions are executed by, for example, a controller 197 of an example charging station 196, such instructions may cause a truck controller 154, a paving machine controller 172, a controller 188 of a compaction machine 114, the system controller 122, and/or other components of the system 100 to perform the recited operations. Such computer-executable instructions may include routines, programs, objects, components, data structures, and the like that perform particular functions or implement particular abstract data types. The order in which the operations are described is not intended to be construed as a limitation, and any number of the described steps can be combined in any order and/or in parallel to implement the process. For discussion purposes, and unless otherwise specified, the method 300 is described with reference to the system 100, the controller 197, the system controller 122, the various machines (e.g., a compaction machine 114) of the system 100, and/or other items shown in FIGS. 1 and 2. In particular, although any part of and/or the entire method 300 may be performed by the system controller 122, the truck controller 154, the paving machine controller 172, the paving material plant controller 144, the electronic device 128, the controller 188, the controller 264, and/or other mobile machines or components of the system 100, unless otherwise specified, the method 300 will be described below with respect to the controller 197 of an example charging device 195 (e.g., an example charging station 196) and a controller 188 of an example mobile machine (e.g., an example compaction machine 114) for ease of description.

With reference to FIG. 3, at 302 a controller 197 of an example charging device 195 (e.g., an example charging station 196) may identify and/or otherwise determine a machine identifier unique to a particular mobile machine (e.g., an example compaction machine 114). For example, at 302 one or more load sensors, proximity sensors, LIDAR sensors, RADAR sensors, SONAR sensors, and/or other sensors of the charging station 196 operably connected to the controller 197 may detect the presence of the compaction machine 114 within the charging zone 194. In such examples, one or more such sensors operably connected to the controller 197 may detect that the compaction machine 114 is disposed, for example, adjacent or proximate the charging station 196 and/or otherwise at a location within the charging zone 194 suitable for forming a data connection and/or a power connection between the charging station 196 and the compaction machine 114. In such examples, the compaction machine 114 may be disposed within approximately 10 feet, within approximately 5 feet, within approximately 1 foot, and/or at any suitable distance from the charging station 196 such that the coupling device 199 of the charging station 196 may be positioned, manipulated, oriented, and/or otherwise moved in order to mate with the corresponding coupling device 192 of the compaction machine 114. At 302, one or more such sensors may provide signals and/or other information indicative of the presence and/or location of the compaction machine 114 to the controller 197, and the controller 197 may determine that the compaction machine 114 is disposed within the charging zone 194 and/or is disposed at any of the suitable distance as noted above for mating the coupling device 199 of the charging station 196 with the coupling device 192 of the compaction machine 114.

At 302, and based at least on determining that the compaction machine 114 is disposed within the charging zone 194, the controller 197 may identify and/or otherwise determine a machine identifier unique to the compaction machine 114 or other mobile machine disposed within the charging zone 194. For example, when the compaction machine 114 is disposed within the charging zone 194 and/or proximate the charging station 196, one or more barcode readers, quick response code readers, Bluetooth devices, near-field communication devices, cameras, scanners, and/or other sensors of the charging station 196 may determine information indicative of such a machine identifier. Such a machine identifier may comprise a vehicle identification number, a license plate number, and/or other formation uniquely identifying the compaction machine 114. In such examples, the one or more sensors of the charging station 196 may provide such information to the controller 197, and at 302, the controller 197 may parse and/or otherwise process such information to determine the machine identifier.

At 304, the controller 197 may determine a charge requirement associated with the compaction machine 114 based at least in part on the machine identifier determined at 302. For example, upon determining the machine identifier unique to the compaction machine 114, the controller 197 may access one or more data logs, databases, lists, and/or other information stored in the memory 198 operably connected to the controller 197. Such information may include, for example, a list correlating the plurality of machine identifiers to voltage, current, battery capacity, minimum charge, maximum charge, and/or other charge requirements corresponding to and/or otherwise associated with each individual machine identifier. In any of the examples described herein, upon determining the one or more charge requirements associated with the particular compaction machine 114 and/or other mobile machine disposed at the charging station 196, the controller 197 may cause the charging station 196 and/or other charging device 195 described herein to direct electrical current to the energy storage device 190 of the compaction machine 114 in accordance with and/or otherwise based on the one or more charge requirements particular to the compaction machine 114. As will be described below, the controller 197 may cause the charging station 196 to direct such electrical current to the energy storage device 190 of the compaction machine 114 via a power connection established between the charging station 196 and the compaction machine 114.

At 306, the controller 197 associated with the charging station 196 and/or other example charging devices 195 of the present disclosure may establish a data connection between the controller 197 and controller 188 of the compaction machine 114. For example, at 306 the controller 197 may cause the coupling device 199 to be oriented, positioned, and/or otherwise moved relative to the coupling device 192 of the compaction machine 114, and to thereby mate with the coupling device 192. In doing so, at 306 the controller 197 may cause one or more motors or other actuators operably connected to the coupling device 199 to orient, position, maneuver, and/or otherwise configure the coupling device 199 to physically and electronically mate with the coupling device 192 of the compaction machine 114 at the charging station 196. Physically and electronically mating the coupling device 199 with the coupling device 192 at 306 may include physically connecting, electronically connecting, and/or otherwise mating contacts, couplings, electrical leads, or other components of the coupling device 199 configured to receive a plurality of electronic files, signals, or other digital items containing information with corresponding components of the coupling device 192. Such components of the coupling device 199 may also be configured to provide a plurality of electronic files, signals, or other digital items containing information stored in the memory 198 to the controller 188 of the compaction machine 114.

At 308, the controller 197 may provide a data request to the controller 189 of the compaction machine 114. For example, at 308 the controller 197 may generate and transmit a digital signal to the controller 188, via the data connection established at 306. Such a digital signal may include, for example, instructions, a request, an executable command, and/or other information indicating a request by the controller 197 to obtain electronic files and/or other information stored in the memory 189 of the compaction machine 114. In such examples, upon receipt of the data request generated and provided at 308, the controller 188 of the compaction machine 114 may generate a corresponding authentication request, and may provide the authentication request to the controller 197 via the data connection established at 306. In such examples, the authentication request may comprise a request for information uniquely identifying the charging station 196, the charging zone 194, and/or other components of the system 100. In particular, in such examples the controller 189 of the compaction machine 114 may govern (e.g., permit, restrict, or limit) the transmission of information from the memory 188 to other components of the system 100 including, but not limited to, the controller 197 of the charging station 196 and the system controller 122 based on authentication of such components. In such examples, the controller 189 of the compaction machine 114 may also govern the receipt of information from one or more such components.

At 310, based on the data request provided to the controller 188 at 308, the controller 197 may receive the authentication request generated at 308. Similar to the data request, the authentication request received at 310 include, for example, instructions, a request, an executable command, and/or other information indicating a request by the controller 188 to obtain information uniquely identifying the charging station 196. Such information may include, for example, one or more alphanumeric codes or other identifiers indicating that the charging station 196 is an acceptable device for sharing information. In some examples, such authentication information may uniquely identify the charging station 196 as being associated with the worksite 112, the machines and/or other components of the system 100, one or more projects to which the compaction machine 114 has been assigned, and/or with other information stored in the memory 189 and indicating that the charging station 196 is a trusted device.

At 312, based on the authentication request received at 310, the controller 197 may provide the requested authentication information uniquely identifying the charging station 196 to the controller 188 of the compaction machine 114, via the data connection. Similar to the data request noted above, the authentication information provided at 312 may include instructions, an executable command, and/or other information uniquely identifying the charging station 196 to the controller 188 of the compaction machine 114.

Upon receipt of such authentication information, the controller 188 may compare such information to authentication information stored in memory 189 operably connected controller 188 in order to verify whether the charging station 196 comprises a trusted device with which the controller 188 may share information. For example, at 314, the controller 188 may access one or more data logs, databases, lists, and/or other information stored in the memory 189 operably connected to the controller 188. Such stored information may include, for example, a list correlating authentication information with acceptable controllers 197, charging stations 196, charging units 195, system controllers 122, and/or other components of the system 100 with which the controller 188 may share information. At 314, the controller 188 may determine whether the authentication information received at 312 matches any of the information included in one or more such lists. In such examples identifying a match may indicate to the controller 188 that the authentication information received at 312 has been verified and that the controller 188 is permitted to share information with the controller 197 of the charging station 196. However, identifying no such match at 314 may indicate to the controller 188 that the controller 188 is not permitted to share information with the controller 197. Thus, if at 314 the controller 188 determines that no such match exists or is otherwise unable to verify the authentication information received at 312 (Step: 314—N), the controller 188 may send a signal to the controller 197 indicating that access to files stored in the memory 189 has been denied. In such examples, at 316 the controller 197 of the charging station 196 may terminate, disconnect, and/or otherwise sever the data connection established at 306. On the other hand, if at 314 the controller 188 determines that a match does exist between the authentication information received at 312 and the information included in one or more of the lists described above, or is otherwise able to verify the authentication information received at 312 (Step: 314—Y), the controller 188 may send a signal to the controller 197 indicating that access to files or other information stored in the memory 189 has been granted.

It is understood that in some examples, the data connection established at 306 may comprise a preliminary or otherwise limited data connection established between the controller 197 of the charging station 196 and the controller 188 of the compaction machine 114. Such an example preliminary data connection may be established for the purpose of authenticating the charging station 196 and/or otherwise verifying that it is acceptable to provide information to, and to receive information from, the controller 197 of the charging station 196. In such examples, upon authentication of the charging station 196 at 314, the controller 197 may establish a broader data connection that is configured to facilitate the transfer of electronic files and/or other information between the controller 197 and the controller 188. In other examples, the data connection described above with respect to 306 may not be established until and unless the authentication information provided by the controller 197 at 312 has been verified by the controller 188 at 314. In any of the examples described herein, the one or more data connections described above may be established by the controller 197 and/or by the controller 188 based on validation, of the authentication information provided at 312, by the controller 188.

At 318, the controller 197 may cause, while the data connection established at 306 exists and via a power connection between the charging station 196 and the compaction machine 114, the charging station 196 to direct energy (e.g., electrical current) to the energy storage device 190 of the compaction machine 114 via the coupling device 199. For example, at 318 the controller 197 may cause the coupling device 199 and/or other components of the charging station 196 to form a power connection (e.g., an electrical connection) with the coupling device 192. It is understood that due to the data connection established at 306, the coupling device 199 may already be mated with the coupling device 192 at 318. Such a power connection may be established at 318 between mating magnetic and/or conductive lugs, terminals, receptacles, leads, contacts, or other components of the respective coupling devices 199, 192 configured to provide electrical current at a desired voltage or over a range of voltages. For example, at 318 the controller 197 may cause the coupling device 199 to direct electrical current to the energy storage device 190 in accordance with and/or otherwise based on the voltage specifications, current specifications, and/or other charge requirements determined at 304 and indicating an acceptable manner for directing power to the energy storage device 190 of the compaction machine 114. In some examples, such charge requirements may also include a length of time (e.g., a charge duration) during which the charging station 196 may be controlled, at 318, to provide electrical current to the compaction machine 114.

It is understood that in any of the examples described herein, the controller 197 may cause the coupling device 199 to direct electrical current to the energy storage device 190 at any time during the method 300 (e.g., during any operation or step described herein with respect to the method 300), and such an operation may not be dependent upon, for example, any of the operations described above with respect to steps 308-314. For example, the controller 197 may cause the coupling device 199 to direct electrical current to the energy storage device 190 at 318, via the power connection described herein, regardless of whether the data connection described above with respect to 306 has been established. For instance, the controller 197 may cause the coupling device 199 to direct electrical current to the energy storage device 190 at 318 even if one or more of steps 308-314 are omitted.

At 320, the controller 197 may receive, via the data connection established at 306, a plurality of electronic files and/or other information stored in the memory 189 of the compaction machine 114 operably connected to the controller 118. Such information may include, for example, location (e.g., GPS coordinates), speed, acceleration, deceleration, temperature, compaction/density of the paving material 108, video, audio, proximity information, and other information determined by the sensors and/or other components of the compaction machine 114, in real time, as the compaction machine 114 is controlled to perform various operations at the worksite 112. Such electronic files and/or other information may be stored, by the controller 188, in the memory 189 of the compaction machine 114, and may be retained in the memory 189 at least until it is transferred to the controller 197 or other controllers described herein (e.g., the controller 264 of the additional mobile machine 260 described above). In any of the examples described herein, the controller 197 may receive the plurality of electronic files at 320, via the data connection described herein, regardless of whether electrical current has been directed to the energy storage device 190 of the compaction machine 114 at 318. For example, at 320 the controller 197 may receive, via the data connection established at 306, a plurality of electronic files and/or other information stored in the memory 189 even if step 318 is omitted.

It is understood that the memory 189 may be configured to store a wide variety of different types of electronic files and/or associated information. Thus, the plurality of files and/or other information received at 320 may comprise a subset of the files and/or other information stored in the memory 189 operably connected to the controller 188. In such examples, the controller 188 may be configured to identify and/or otherwise select the subset of files transferred at 320 from a remainder of the total files stored in the memory 189. For example, at 320 the controller 188 may identify a subset of electronic files and/or other information for transfer based on a predetermined set of priority rules. Such priority rules may cause the controller 188 to prioritize various types of electronic files and/or other information for transfer to the controller 197. For example, such priority rules may cause the controller 188 to prioritize video files, audio files, and/or other types of files stored in the memory 189 for transfer to the controller 197. In other examples, such priority rules may cause the controller 188 to prioritize location information (e.g., GPS coordinates), paving material temperature information, paving material density, and/or other information for transfer to the controller 197. In any such examples, the controller 188 may identify and/or select such electronic files and/or other information based at least in part on a file type identifier (e.g., a ".mov" file, a ".wav" file, or other file name/file extension) or other relevant metadata associated with each individual electronic file. In any of the examples described herein, prioritizing the transfer of such electronic files based on the priority rules described above may cause such prioritized files to be transferred to the controller 197 at 320 prior to the transfer of other non-prioritized files stored in the memory 189. Further, in any of the examples described herein, and based on the priority rules described above, a remainder of the electronic files and/or other information stored in the memory 189 may be retained in the memory 189 for future use by the controller 188. In such examples, the remainder of electronic files and/or other information stored in the memory 189 may not be transferred to the controller 197 at 320.

At 322, the controller 197 may store the plurality of electronic files and/or other information received at 320 in the memory 198 of the charging station 196 operably connected to the controller 197. In any of the examples described herein, the controller 197 may store such electronic files in accordance with any data storage architecture, data storage rules, and/or other information storage strategy associated with the system 100. For example, at 322 the controller 197 may store each file of the plurality of electronic files received at 320 in association with the machine identifier received at 302. In this way, each file of the plurality of electronic files stored at 322 may be retrieved, sorted, and/or otherwise identified using the machine identifier unique to the particular compaction machine 114. In such examples, each file of the plurality of electronic files may be named, labeled, tagged, and/or otherwise associated with metadata indicating the unique machine identifier. Additionally or alternatively, each file of the plurality of electronic files may be stored in one or more respective folders that have been named, labeled, tagged, and/or otherwise associated with metadata indicating the unique machine identifier.

Further, and in any of the examples described herein, at 322 the controller 197 may identify an information and/or file type corresponding to one or more files of the plurality of electronic files received at 320. At 322, the controller may identify the information and/or file type based at least in part on a file type identifier (e.g., a ".mov" file, a ".wav" file, or other file name/file extension) or other relevant metadata associated with each individual electronic file received at 320. In such examples, at 322 the controller 197 may store the one or more files and/or each file of the plurality of electronic files in a portion of the memory 198 corresponding to the identified information and/or file type. For example, the memory 198 may include one or more folders, databases, and/or other portions, components, or locations designated for storing video files received from the controller 188. In such examples, at 322 the controller 197 may identify one or more electronic files received at 320 as comprising video files (e.g., files having a ".mov" extension or other file name/file extension indicative of a video file), and may store such files in a folder of the memory 198 corresponding to such an information and/or file type.

At 324, the controller 197 may determine whether each file of the plurality of electronic files was completely and accurately stored in the memory 198 at 322. It is understood that this may be done in a variety of different ways. For example, at 324 the controller 197 may perform a hash function or other mathematical equation on each file of the plurality of electronic files stored in the memory 198. In such examples, if a hash value obtained by executing the hash function on each of the stored files matches an actual hash value associated with the corresponding file stored in the memory 189, the controller 197 may determine that each such respective file was transferred properly. As a result, the controller 197 may generate a signal or other such indication indicating that each particular file has been properly stored in the memory 198. Additionally or alternatively, at 324 the controller 197 may determine and/or identify a file size of each file of the plurality of electronic files as stored in the memory 198 at 322. The controller 197 may, at 324 compare the respective file sizes of the files stored in the memory 198 with information from the controller 188 and/or from the memory 189 indicating the actual file sizes of each of the respective files as stored in the memory 189. If the file size of each file stored in the memory 198 matches the actual file size of the corresponding files stored in the memory 189, the controller 197 may determine that such files were transferred properly at 320. Accordingly, for each file stored in the memory 198 at 322, and having a respective file size matching an actual file size of a corresponding files stored in the memory 189, at 324 the controller 197 may generate, based on such file sizes, a signal or other such indication indicating that the particular file has been properly stored in the memory 198.

At 326, the controller 197 may provide to the controller 188, via the data connection established at 306, the indication generated at 324. In particular, at 326 the controller 197 may provide an indication to the controller 188 that each file of the plurality of electronic files received at 320 has been stored, at 322, in the memory 198 of the charging station 196. In any of the examples described herein, the indication generated at 324 and provided at 326 may comprise a command, a request, a control file, and/or other executable file. In such examples, the indication provided at 326 may be executable by the controller 188 to take one or more actions with respect to various files stored in the memory 189 and corresponding to electronic files and/or other information received at 320. For example, when executed by the controller 188, the indication provided at 326 may cause the controller 188 to delete one or more electronic files stored in the memory 189 and corresponding to electronic files received at 320. In any of the examples described herein, the controller 188 may be configured to delete each file of the plurality of electronic files stored in the memory 189, and corresponding to electronic files received at 320, based on the indication. On the other hand, in some examples, one or more of the electronic files stored in the memory 189 and corresponding to the electronic files received at 320 may be retained in the memory 189 for future use.

In any of the examples described herein, it is understood that the data connection established at 306 may be configured not only to facilitate the transfer of electronic files and/or other information from the controller 188 to the controller 197 at 320, but may also be configured to facilitate the transfer of electronic files and/or other information from the controller 197 to the controller 188 during any of the operations associated with the method 300. For example, in some instances, at 326 the controller 197 may provide one or more additional electronic files to the controller 188 for execution and/or for storage in the memory 189. Such additional electronic files may be executable by the controller 188 of the compaction machine 114 to update a software application, program, component, or other such software system of the compaction machine 114. In such examples, such one or more additional electronic files may be received, by the controller 197 of the charging station 196, from the system controller 122, via the network 124. Additionally or alternatively, such one or more additional electronic files may be received by the controller 197 through manual input, such as via manual upload or download by an operator.

At 328, the controller 197 may establish an additional data connection with the system controller 122, via the network 124. In such examples, the data connection established at 328 may be substantially similar to and/or the same as the data connection established at 306, however, the data connection established at 328 may not require the mating and/or other coupling operations described above with respect to the coupling device 199. For example, the data connection established at 328 may comprise a network connection, and/or a wired or wireless connection established via the network 124. In some examples, the data connection established at 328 may be formed using the communication device 126 of the charging station 196. Such a data connection may be intermittent and/or may be established when communication (e.g., connectivity) between the controller 197 and the system controller 122 is available via the network 124. In any of the examples described herein, the data connection established at 328 may be operable and/or otherwise configured to facilitate the transfer of one or more electronic files and/or other information from the controller 197 to the system controller 122, and/or to facilitate the transfer of one or more electronic files and/or other information from the system controller 122 to the controller 197.

At 330, the controller 197 may transfer, via the network 124 and/or via the data connection established at 328, the plurality of electronic files received at 320 from the memory 198 to the system controller 122. As noted above, in some examples the system controller 122 may be disposed at a location remote from the charging zone 194 and/or remote from the charging station 196. In such examples, the system controller 122 may be disposed at the paving material plant 102 and/or at any other location remote from the worksite 112. Upon receipt of such electronic files at 330, the system controller 122 may store electronic files in the memory 123. In some examples, the system controller 122 may store electronic files and/or other information received at 330 in the memory 123 in a fashion similar to the storage operation described above with respect to 322.

At 316, the controller 197 may sever one or more of the data connections described herein. For example, at 316, upon completing the transfer of electronic files and/or other information at 330, the controller 197 may terminate, disconnect, and/or otherwise sever the data connection established at 328. Additionally and/or alternatively, at 316, upon providing the indication described above with respect to 326, the controller 197 may terminate, disconnect, and/or otherwise sever the data connection established at 306. In any of the examples described herein, it is understood that severing the power connection described above with respect to at least 318 may also cause the one or more data connections described herein to be severed. For example, the power connection described above may be established at 318 via electrically connecting and/or otherwise mating the coupling device 199 of the charging station 196 with the corresponding coupling device 192 of the compaction machine 114. In such examples, the data connection between the controller 197 and the controller 189 described above may also be established at 306 by electrically connecting and/or otherwise mating the coupling device 199 with the corresponding coupling device 192. In such examples, the power connection formed by mating the corresponding coupling devices 192, 199 may be configured such that severing the power connection (e.g., by mechanically decoupling and/or otherwise disconnecting the coupling devices 192, 199) causes the data connection established at 306 to be severed. In any of the examples described herein, the data connection formed by mating the coupling devices 192, 199 may be configured such that the controller 197 may sever the data connection, at 316, based at least in part on a severing of the power connection, the passage of a predetermined amount of time (e.g., 30 minutes, 45 minutes, one hour, etc.), or the transfer of a predetermined amount of data, information, electronic files, etc. from the controller 189 to the controller 197.

In this way, the method 300 described with respect to FIG. 3 may be employed to enable coordinated recharging of various machines of the system 100 in order to minimize work stoppages and to maximize overall efficiency of the system 100. The operations included in the method 300 may also facilitate the transmission of electronic files and/or other information associated with the performance of worksite tasks, from the various machines to a memory associated with a charging unit (e.g., a charging station 196 and/or a mobile machine 260) to ensure that such information is properly maintained for further use. Such transmission may occur during the one or more recharging events described herein to further increase efficiency.

INDUSTRIAL APPLICABILITY

The present disclosure addresses problems which can arise when technology rich work machines log and store large amounts of data. Such data can include machine usage data, autonomy logs, productivity data, machine health, etc. Typically, that data is stored in onboard memory of the work machine until a mobile data connection is available, or the data is manually downloaded by a technician. Without a mobile data connection (such as in remote locations), onboard memory can fill up fast, and past data can be lost. The loss of such data could result in technological, strategic, legal, and financial consequences for customers, dealers, and equipment providers.

The present disclosure provides systems and methods for controlling the recharging of various machines included in a system 100, in a coordinated fashion, and to facilitate the transfer of electronic files or other information to a controller and memory of a charging unit used for such recharging events. The example systems and processes described herein may be configured to cause the source files stored in on-board memory of the machines to be deleted once transferred, in order to maintain sufficient storage capacity in the memory. The example systems and processes described herein also allow various mobile machines to have a lower-end mobile data plan while the charger has a higher-end data (e.g., a relatively higher-speed, more robust, continuous, relatively high-bandwidth, relatively high file transfer rate, etc.) plan, Wi-Fi capability, or a physical connection to the Internet or other network.

For instance, an example charging unit of the present disclosure includes a first controller that is programmed or otherwise configured to establish a data connection with a second controller of a mobile machine disposed at a worksite. In such examples, the first controller may receive, via the data connection, a plurality of electronic files stored in a memory of the mobile machine operably connected to the second controller. In such examples, the plurality of files may be selected by the second controller for transfer to the first controller. The first controller may store the plurality of electronic files in the memory operably connected to the first controller. The first controller may also provide, to the second controller, via the data connection, an indication that each file of the plurality of electronic files has been stored in the memory operably connected to the first controller. Further, the second controller may be configured to delete each file of the plurality of electronic files from the memory of the mobile machine based on the indication.

Unless explicitly excluded, the use of the singular to describe a component, structure, or operation does not exclude the use of plural such components, structures, or operations or their equivalents. The use of the terms "a" and "an" and "the" and "at least one" or the term "one or more," and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B" or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method of controlling charging and data transfer between a mobile machine and a charging unit, the method comprising:

establishing, with a first controller operably connected to the charging unit, a data connection between the first controller and a second controller of the mobile machine;

causing, by the first controller, while the data connection exists, and via a power connection between the charging unit and the mobile machine, the charging unit to direct electrical current to an energy storage device of the mobile machine;

receiving, by the first controller and via the data connection, a plurality of electronic files stored in a memory of the mobile machine operably connected to the second controller, wherein the plurality of files is selected by the second controller for transfer to the first controller;

storing, by the first controller, the plurality of electronic files in a memory of the charging unit operably connected to the first controller, wherein storing the plurality of electronic files comprises:

identifying, by the first controller, an information type corresponding to a file of the plurality of electronic files, and storing the file in a portion of the memory of the charging unit corresponding to the information type; and providing to the second controller, by the first controller and via the data connection, an indication that each file of the plurality of electronic files has been stored in the memory of the charging unit, wherein the second controller is configured to delete each file of the plurality of electronic files from the memory of the mobile machine based on the indication.

2. The method of claim 1, further comprising:

providing, by the first controller, a data request to the second controller;

receiving, by the first controller and based on the data request, an authentication request from the second controller; and providing, by the first controller and based on the authentication request, authentication information uniquely identifying the charging unit to the second controller, wherein the data connection is established by the first controller based on validation of the authentication information by the second controller.

3. The method of claim 1, wherein the mobile machine comprises an autonomous mobile machine, and the charging unit comprises one of: a stationary electric charging station, or an additional mobile machine.

4. The method of claim 1, wherein the power connection is configured such that severing the power connection causes the data connection to be severed.

5. The method of claim 1, further comprising:

determining, by the first controller, a charge requirement of the mobile machine; and causing, by the first controller, the charging unit to direct the electrical current to the energy storage device based on the charge requirement.

6. The method of claim 5, wherein the charging unit is disposed within a charging zone at a worksite, the method further comprising:

determining, by the first controller, that the mobile machine is disposed within the charging zone;

determining, by the first controller and based on determining that the mobile machine is disposed within the charging zone, a machine identifier unique to the mobile machine; and determining, by the first controller, the charge requirement based on the machine identifier.

7. The method of claim 1, further comprising:

determining, by the first controller, a file size of each file of the plurality of electronic files as stored in the memory of the charging unit; and generating, by the first controller, the indication based on the file sizes.

8. The method of claim 1, further comprising transferring, by the first controller and via a network, the plurality of electronic files from the memory of the charging unit to a third controller disposed remote from the first controller.

9. The method of claim 1, wherein storing the plurality of electronic files further comprises:

determining, by the first controller, a machine identifier unique to the mobile machine; and storing the plurality of electronic files in the memory of the charging unit and in association with the machine identifier.

10. A charging unit, comprising:

a first controller; and a memory operably connected to the first controller, the memory storing instructions which, when executed by the first controller, cause the first controller to perform operations comprising:

establishing a data connection with a second controller of a mobile machine disposed at a worksite;

directing, while the data connection exists and via a power connection between the charging unit and the mobile machine, electrical current to an energy storage device of the mobile machine;

receiving, via the data connection, a plurality of electronic files stored in a memory of the mobile machine operably connected to the second controller, wherein the plurality of files is selected by the second controller for transfer to the first controller, wherein the plurality of electronic files comprises a subset of files stored in the memory of the mobile machine operably connected to the second controller, the second controller being configured to select the subset of files from a remainder of files stored in the memory of the mobile machine operably connected to the second controller and which are not transferred to the first controller;

storing the plurality of electronic files in the memory operably connected to the first controller;

providing to the second controller, via the data connection, an indication that each file of the plurality of electronic files has been stored in the memory operably connected to the first controller, wherein the second controller is configured to delete each file of the plurality of electronic files from the memory of the mobile machine based on the indication; and severing the data connection based at least in part on: severing of the power connection, passage of a predetermined amount of time, or transfer of a predetermined amount of data from the second controller to the first controller.

11. The charging unit of claim 10, wherein:

the charging unit comprises a stationary charging station disposed at the worksite;

the mobile machine comprises an autonomous mobile machine; and the energy storage device comprises a rechargeable battery.

12. The charging unit of claim 11, wherein:

the autonomous mobile machine includes a first coupling device operably connected to the rechargeable battery, the charging station includes a second coupling device configured to form the power connection by mating with the first coupling device, and the electrical current is provided to the rechargeable battery via the first coupling device and the second coupling device.

13. The charging unit of claim 10, wherein the data connection comprises a first data connection, and the operations further comprise:

establishing a second data connection, via a network, with a third controller disposed remote from the worksite; and transferring, via the second data connection, the plurality of electronic files from the memory operably connected to the first controller to the third controller.

14. The charging unit of claim 10, the operations further comprising:

providing a data request to the second controller;

receiving, based on the data request, an authentication request from the second controller; and providing, based on the authentication request, authentication information uniquely identifying the charging unit to the second controller, wherein the data connection is established by the first controller based on validation of the authentication information by the second controller.

15. A system, comprising:

a stationary charging station disposed within a charging zone of a worksite, the charging station including a first controller and a memory operably connected to the first controller;

a mobile machine disposed at the worksite, the mobile machine including a second controller, a memory operably connected to the second controller, and a rechargeable battery;

a third controller disposed remote from the worksite; and a network configured to transfer information between at least the first controller and the third controller, wherein the first controller is configured to:

establish a data connection with the second controller;

direct, while the data connection exists and via a power connection between the charging station and the mobile machine, electrical current to the rechargeable battery;

receive, via the data connection, a first plurality of electronic files stored in the memory operably connected to the second controller, wherein the first plurality of files is selected by the second controller for transfer to the first controller;

store the first plurality of electronic files in the memory operably connected to the first controller;

provide to the second controller, via the data connection, an indication that each file of the first plurality of electronic files has been stored in the memory operably connected to the first controller, wherein the second controller is configured to delete each file of the first plurality of electronic files from the memory operably connected to the second controller based on the indication;

transfer, via the network, the first plurality of electronic files from the memory operably connected to the first controller to the third controller; and transfer, via the data connection, a second plurality of electronic files to the second controller, the second plurality of files being:

received from the third controller, via the network, and executable by the second controller to update a software system of the mobile machine.

16. The system of claim 15, wherein the first plurality of files comprises a subset of files stored in the memory operably connected to the second controller, the second controller being configured to select the subset of files from a remainder of files stored in the memory operably connected to the second controller and which are not transferred to the first controller.

17. The system of claim 16, wherein selecting the subset of files from the remainder of files comprises prioritizing video files, stored in the memory operably connected to the second controller, for transfer to the first controller.

18. The system of claim 15, wherein transferring the first plurality of electronic files from the memory operably connected to the first controller to the third controller includes establishing, with the first controller, a data connection with the third controller, via the network.

*　*　*　*　*